US008767964B2

(12) United States Patent
Bae et al.

(10) Patent No.: US 8,767,964 B2
(45) Date of Patent: Jul. 1, 2014

(54) SECURE COMMUNICATIONS IN COMPUTER CLUSTER SYSTEMS

(75) Inventors: Myung M. Bae, Pleasant Valley, NY (US); Christopher V. DeRobertis, Hopewell Junction, NY (US); Robert K. Gardner, Saugerties, NY (US); Robert R. Gensler, Jr., Hyde Park, NY (US); John R Hare, Highland, NY (US); Felipe Knop, Lagrangeville, NY (US); Serban C. Maerean, Ridgefield, CT (US); Johannes Sayre, Kingston, NY (US); Hemant R. Suri, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 883 days.

(21) Appl. No.: 12/056,202

(22) Filed: Mar. 26, 2008

(65) Prior Publication Data

US 2009/0245518 A1   Oct. 1, 2009

(51) Int. Cl.
| | | |
|---|---|---|
| H04L 29/06 | (2006.01) | |
| G06F 21/30 | (2013.01) | |
| H04L 9/08 | (2006.01) | |
| H04L 9/12 | (2006.01) | |
| H04L 9/14 | (2006.01) | |
| H04L 9/16 | (2006.01) | |

(52) U.S. Cl.
CPC  *G06F 21/30* (2013.01); *H04L 9/08* (2013.01); *H04L 9/12* (2013.01); *H04L 9/14* (2013.01); *H04L 9/16* (2013.01); *H04L 9/0816* (2013.01); *H04L 9/0838* (2013.01); *H04L 9/085* (2013.01); *H04L 9/0891* (2013.01); *H04L 63/065* (2013.01)
USPC ........... 380/277; 380/278; 380/283; 380/284; 713/168; 713/171

(58) Field of Classification Search
CPC ............. G06F 21/30; H04L 9/08; H04L 9/12; H04L 9/14; H04L 9/16; H04L 9/0816; H04L 9/0838; H04L 9/085; H04L 9/0891; H04L 63/0428; H04L 63/065; H04L 63/061; H04L 63/068; H04L 63/08; H04L 63/062

USPC ......... 380/259, 260, 273, 277, 278, 279, 281, 380/283, 284, 286, 28, 29; 713/100, 150, 713/153, 160, 161, 162, 163, 168, 171, 176, 713/181; 726/6, 7; 709/201, 202, 220, 221, 709/228, 248
See application file for complete search history.

(56) References Cited

U.S. PATENT DOCUMENTS

| | | | | |
|---|---|---|---|---|
| 6,035,041 | A | * | 3/2000 | Frankel et al. ................. 380/30 |
| 6,064,297 | A | | 5/2000 | Odinak et al. ........... 340/310.01 |

(Continued)

FOREIGN PATENT DOCUMENTS

| | | | |
|---|---|---|---|
| CN | 1777099 A | 5/2006 | ............... H04L 9/16 |
| WO | WO 03/088558 | 10/2003 | |
| WO | WO 03/088558 A1 | 10/2003 | ............... H04L 9/00 |

OTHER PUBLICATIONS

International Search Report and Written Opinion for International Application PCT/EP2009/053227 (Sep. 24, 2009).

(Continued)

*Primary Examiner* — Eleni Shiferaw
*Assistant Examiner* — Hilary Branske
(74) *Attorney, Agent, or Firm* — Ido Tuchman; Libby Z. Toub (57) ABSTRACT

A system to improve communication security in cluster machine processing may include interconnected computers that can jointly process data. The system may also include a shared secret key used by each of the interconnected computers to encrypt, decrypt, and/or authenticate data being sent, or received, from one of the interconnected computers to another of the interconnected computers. The system may further include a new shared secret key used by each of the interconnected computers to encrypt, decrypt, and/or authenticate data being sent, or received, from one of the interconnected computers to another of the interconnected computers. In addition, the new shared secret key may coexist with the shared secret key without adversely affecting the joint processing of data performed by the plurality of interconnected computers.

14 Claims, 9 Drawing Sheets

(56) References Cited

U.S. PATENT DOCUMENTS

| | | | |
|---|---|---|---|
| 6,295,361 B1* | 9/2001 | Kadansky et al. | 380/278 |
| 7,181,015 B2 | 2/2007 | Matt | 380/279 |
| 7,216,226 B2 | 5/2007 | Ndiaye | 713/155 |
| 7,236,597 B2 | 6/2007 | Elliott et al. | 380/263 |
| 7,245,724 B1* | 7/2007 | Chesson et al. | 380/270 |
| 2002/0110245 A1* | 8/2002 | Gruia | 380/278 |
| 2005/0015471 A1* | 1/2005 | Zhang et al. | 713/201 |
| 2006/0006296 A1 | 1/2006 | Morita | 248/200 |
| 2007/0055870 A1* | 3/2007 | Bruti et al. | 713/168 |
| 2007/0104104 A1* | 5/2007 | Abu-Amara | 370/235 |
| 2007/0192632 A1* | 8/2007 | Botzum et al. | 713/193 |

OTHER PUBLICATIONS

Office Action for Chinese Patent Application 200980110754.X dated Dec. 4, 2012, pp. 1-11.

Examination Report for EPO Patent Application No. 09 726 094.7-1853, pp. 1-4 (Jun. 7, 2013).

* cited by examiner

SECURE COMMUNICATIONS IN COMPUTER CLUSTER SYSTEMS

FIELD OF THE INVENTION

The invention relates to the field of computer systems, and, more particularly, to cluster machine communications.

BACKGROUND OF THE INVENTION

In distributed clusters of computing nodes it is frequently desirable to provide communications security for message traffic between nodes. Messages can be differentiated between control messages and user messages. Control messages are usually sent between system management software agents on the nodes which comprise the cluster to manipulate the state of the cluster and the nodes while user messages usually transmit application data via the cluster's communication facilities between application agents on the nodes.

Each message can usually be viewed as consisting of header information and payload. The header information usually contains data which controls the passage of the message through the cluster's communication facilities. The payload usually contains the information which the message is transmitting between two endpoint agents, which may be either system management or application entities.

Security can be provided across each of these dimensions in several ways. For example, encryption may be used where the byte sequence comprising a component of a message is permuted in some way by use of a function which takes the byte sequence and applies some permuting factor, usually called a key. The permuted byte sequence is then transmitted as the content of that component of the message, and the recipient of the message applies a complementary function and key to acquire the original byte sequence from the received permuted sequence. This provides data privacy in that the original value of the message component may only by acquired by actors that know the permuting key.

In addition, some form of signature and verification (authentication) may be used. In authentication, the byte sequence comprising a component of a message is characterized by a mathematical function, such as a checksum. The characterization is then encrypted (as described in the preceding) and the result is embedded in the message along with the unaltered byte sequence which was characterized. The recipient applies the same characterization to the byte sequence, encrypts the result, and compares its encrypted characterization to that embedded in the message. This provides data integrity in that if the two characterizations are equal, the recipient knows that the message data has not been altered.

Many different encryption algorithms exist. Two major subtypes are public key cryptography and shared secret key cryptography. In public key cryptography, a pair of permuting keys e.g. {k1,k2}, is used where each inverts the result of applying the encryption function to a given byte stream using the other key. In other words, a message encrypted using key k1 can be decrypted using key k2 and vice versa.

Typically, each node in a cluster will generate two keys. One, known as the node's "private key" will be kept secret and known only to the node. The other, known as the node's "public key", will be shared with all other nodes.

Encryption of message content is accomplished by the sender using the public key of the recipient to encrypt the data. The message then can only be decrypted by the recipient's private key, which only the recipient knows.

Authentication may be accomplished by encrypting the message characterization with the sender's private key. All the recipient nodes can then verify the received message (encrypt their corresponding characterization and compare) using the sender's public key and prove that the message not only is unaltered, but also that it was in fact sent by the originator (since no other node's public key will encrypt the recipient's characterization to match the sender's encrypted characterization embedded in the message). Public key types currently in common use (distinguished by key length and permutation function used to encrypt) are RSA-512, RSA-1024, or the like.

In shared secret key cryptography, a single key value is used in a permuting function to encrypt a byte stream. The same key value used with the same function will permute the encrypted stream back to the original.

In a cluster all nodes would share the same secret key value to encrypt and authenticate messages. The key value is thus commonly known to all agents participating in message security within the cluster, but not revealed to any external entities.

Shared secret key cryptography has advantages over public key cryptography in that only one key value is generated, disseminated to and used by all nodes in the computing cluster, rather than a key pair per node. Stated another way, a message encrypted with the shared key by some node can be sent to all nodes and decrypted by them, rather than requiring it to be encrypted separately for each destination node with that node's public key.

In addition, shared secret keys are generally shorter than public/private keys and thus the algorithm used to implement the encryption permutation takes less time to execute on a source message of a given size. Secret key types currently in common use (again distinguished by permutation function and key length) are DES, 3-DES, AES-256, or the like.

SUMMARY OF THE INVENTION

In view of the foregoing background, it is an object of the invention to provide a system using shared secret keys to improve communication security in cluster machine processing.

This and other objects, features, and advantages in accordance with the invention are provided by a system to improve communication security in cluster machine processing. The system may include interconnected computers that can jointly process data. The system may also include a shared secret key used by each of the interconnected computers to encrypt, decrypt, and/or authenticate data being sent, or received, from one of the interconnected computers to another of the interconnected computers. The system may further include a new shared secret key used by each of the interconnected computers to encrypt, decrypt, and/or authenticate data being sent, or received, from one of the interconnected computers to another of the interconnected computers. In addition, the new shared secret key may coexist with the shared secret key without adversely affecting the joint processing of data performed by the plurality of interconnected computers.

The shared secret key and/or new shared secret key may be held in confidence by the interconnected computers. The interconnected computers may be connected to each other via a private communication networks and/or public communication networks.

Each of the interconnected computers may vote when to replace the shared secret key with the new shared secret key for the whole group of interconnected computers. Each of the interconnected computers may authenticate transmitted data with the shared secret key, while authenticating received data with the shared secret key or the new shared secret key based upon the voting.

Each of the interconnected computers may authenticate transmitted data with the new shared secret key, while authenticating received data with the shared secret key or the new shared secret key based upon the voting. Each of the interconnected computers may authenticate transmitted data with the new shared secret key, while authenticating received data with the new shared secret key based upon the voting.

Each of the interconnected computers may indicate whether the shared secret key or the new shared secret key is used to authenticate outgoing data in a header field for the data. Each of the interconnected computers may indicate a count of the shared secret key and the new shared secret key it has in a header field for the data.

Another aspect of the invention is a method to improve communication security in cluster machine processing. The method may include using a shared secret key amongst a plurality of interconnected computers to at least one of encrypt, decrypt, and authenticate data being sent, or received, from one of the plurality of interconnected computers to another of the plurality of interconnected computers.

The method may also include using a new shared secret key by each of the interconnected computers to at least one of encrypt, decrypt, and authenticate data being sent, or received, from one of the interconnected computers to another of the interconnected computers without adversely affecting the joint processing of data performed by the plurality of interconnected computers.

The method may further include voting by each of the interconnected computers to replace the shared secret key with the new shared secret key for the whole group of interconnected computers. As a result, the method may include authenticating transmitted data with the shared secret key, while authenticating received data with the shared secret key or the new shared secret key based upon the voting.

Additionally, the method may further include authenticating transmitted data with the new shared secret key, while authenticating received data with the shared secret key or the new shared secret key based upon the voting. Furthermore, the method may include authenticating transmitted data with the new shared secret key, while authenticating received data with the new shared secret key based upon the voting. The method may also include indicating whether the shared secret key or the new shared secret key is used to authenticate outgoing data in a header field for the data.

DETAILED DESCRIPTION OF THE PREFERRED EMBODIMENTS

The invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As will be appreciated by one skilled in the art, the invention may be embodied as a method, system, or computer program product. Furthermore, the invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device.

Computer program code for carrying out operations of the invention may be written in an object oriented programming language such as Java, Smalltalk, C++ or the like. However, the computer program code for carrying out operations of the invention may also be written in conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
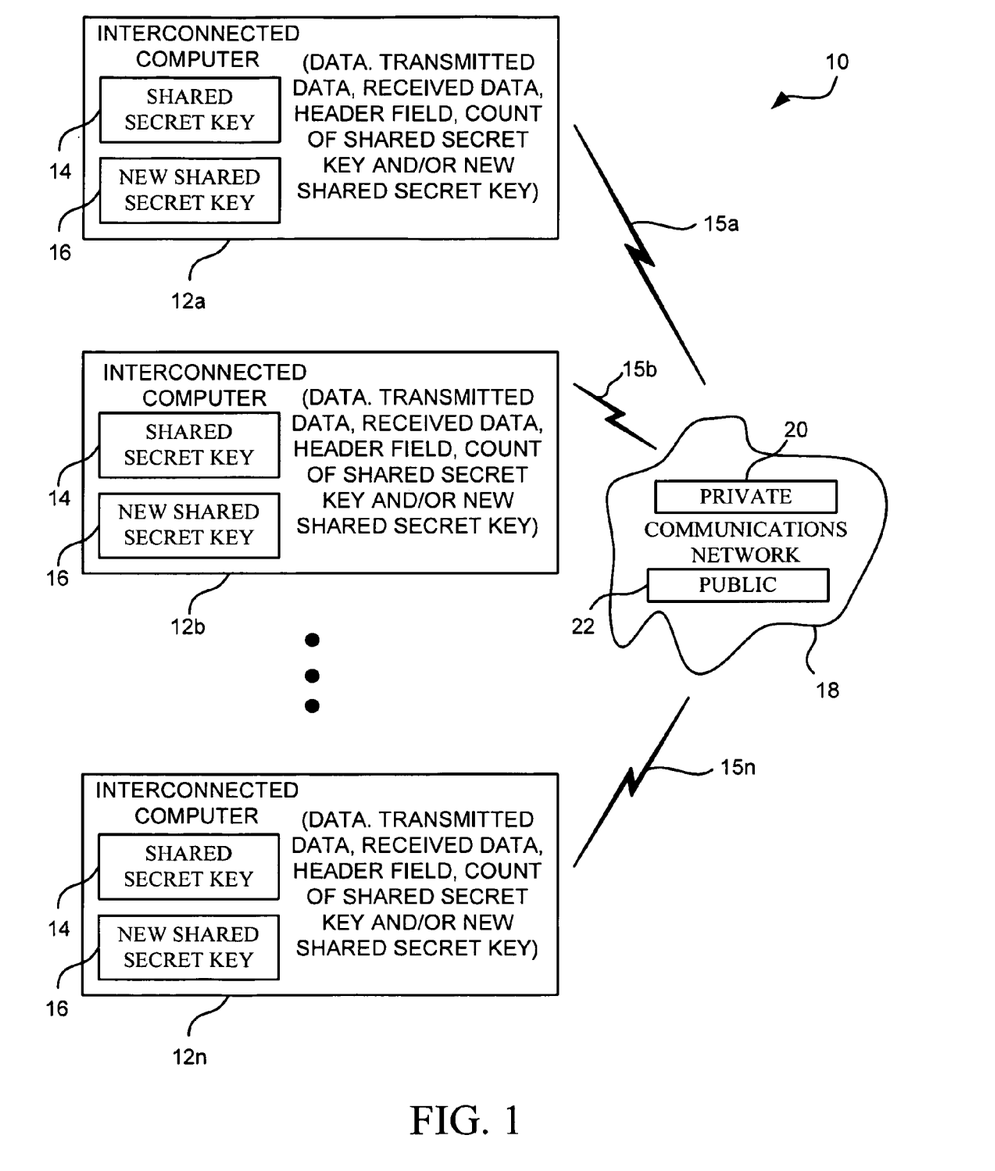
FIG. 1 is a schematic block diagram of a system to improve communication security in cluster machine processing in accordance with the invention.

Referring to FIG. 1, a system 10 to improve communication security in cluster machine processing is initially described. The system 10 includes interconnected computers 12a-12n that can jointly process data such as cluster processing, distributed cluster processing, or the like as will be appreciated by those of skill in the art. The system 10 also includes a shared secret key 14 used by each of the interconnected computers 12a-12n to encrypt, decrypt, and/or authenticate data being sent, or received, from one of the interconnected computers 12a-12n to another of the interconnected computers 12a-12n, for example.

The system 10 further includes a new shared secret key 16 used by each of the interconnected computers 12a-12n to encrypt, decrypt, and/or authenticate data being sent, or received, from one of the interconnected computers to another of the interconnected computers, for instance. In addition, the new shared secret key 16 coexists with the shared secret key 14 without adversely affecting the joint processing of data performed by the plurality of interconnected computers 12a-12n, for example.

In one embodiment, the shared secret key 14 and/or the new shared secret key 16 are held in confidence by the interconnected computers 12a-12n. In other words, the shared secret key 14 and/or the new shared secret key 16 are unknown to parties outside of the interconnected computers 12a-12n.

The interconnected computers 12a-12n are connected respectively to each other via communication links 15a-15n within a communication network 18 as will be appreciated by those of skill in the art. In one embodiment, the communication network 18 includes private communication networks 20 such as wide area networks, local area networks, or the like, and/or public communication networks 22 such as the Internet, cellular communication networks, or the like.

Each of the interconnected computers 12a-12n votes when to replace the shared secret key 14 with the new shared secret key 16 for the whole group of interconnected computers, for example. In one embodiment, each of the interconnected computers 12a-12n authenticates transmitted data with the shared secret key 14, while authenticating received data with the shared secret key or the new shared secret key 16 based upon the voting.

In another embodiment, each of the interconnected computers 12a-12n authenticates transmitted data with the new shared secret key 16, while authenticating received data with the shared secret key 14 or the new shared secret key based upon the voting. In yet another embodiment, each of the interconnected computers 12a-12n authenticates transmitted data with the new shared secret key 16, while authenticating received data with the new shared secret key based upon the voting.

Each of the interconnected computers 12a-12n indicates whether the shared secret key 14 or the new shared secret key 16 is used to authenticate outgoing data in a header field for the data, for example. Each of the interconnected computers 12a-12n indicates a count of the shared secret key 14 and the new shared secret key 16 it has in a header field for the data.

In view of the foregoing, the system 10 improves communication security in cluster machine processing. For example, in a distributed cluster of computing nodes, such as interconnected computers 12a-12n, which communicate by message passing, it is desirable to provide security for messages. Messages include transmitted data, received data, processed data of the like. Various types of message security including message encryption for data privacy, and message signature/verification for data authentication, can be provided.

Various existing algorithms including public key encryption and shared secret key encryption, with various key types including DES, AES, RSA, or the like, exist to implement message security. In a cluster where computing nodes, such as any interconnected computers 12a-12n, carry out collective communication protocols to jointly accomplish distributed actions, using shared secret keys 14 to provide message security has various advantages over use of public/private key pairs. For instance, when a single key value, e.g. shared secret key 14, is used by all nodes, a message secured with that key can be understood by all the nodes 12a-12n. In addition, shared secret key cryptography usually provides better performance than public key cryptography because of the shared secret key cryptography's shorter key lengths.

When computing nodes 12a-12n in a distributed cluster use a shared secret key 14 to provide security for their message communications, the key value may become compromised over time. Thus it is desirable to periodically have the nodes 12a-12n in the cluster change from using the shared secret key 14 currently in use to secure message communications, to a new shared secret key 16 value which will be used forthwith in providing message security. Completing this change from one key value to the next presents several difficulties.

For example, the new shared secret key 16 value must be encrypted for transmission from the node 12a-12n originating the change to all other nodes, because otherwise the new key value could be intercepted by a bad actor and all future communications secured with that key could be compromised. The old shared secret key 14 value should be used to perform this encryption. Thus the old shared secret key 14 and new shared secret key 16 should coexist for some time interval during the key change operation.

Otherwise, if some nodes 12a-12n start using the new shared secret key 16 value to secure messages they transmit before other nodes are prepared to use it to decrypt or authenticate those messages on receipt, then communications in the cluster may break down because such transmitted messages may not be accepted by such recipients. Furthermore, if some nodes 12a-12n fail to accept messages they receive that are secured using the old shared secret key 14 value, before all nodes have started using the shared secret key 16 value to secure messages they transmit, then the key value change may never be completed. As a result, system 10 provides an algorithm to support a collective shared key update operation, which transitions in an orderly fashion all active nodes 12a-12n in a cluster from using a commonly-held key $k_n$ to secure collective message communications, to using a new key $k_{n+1}$.

Figure 2:
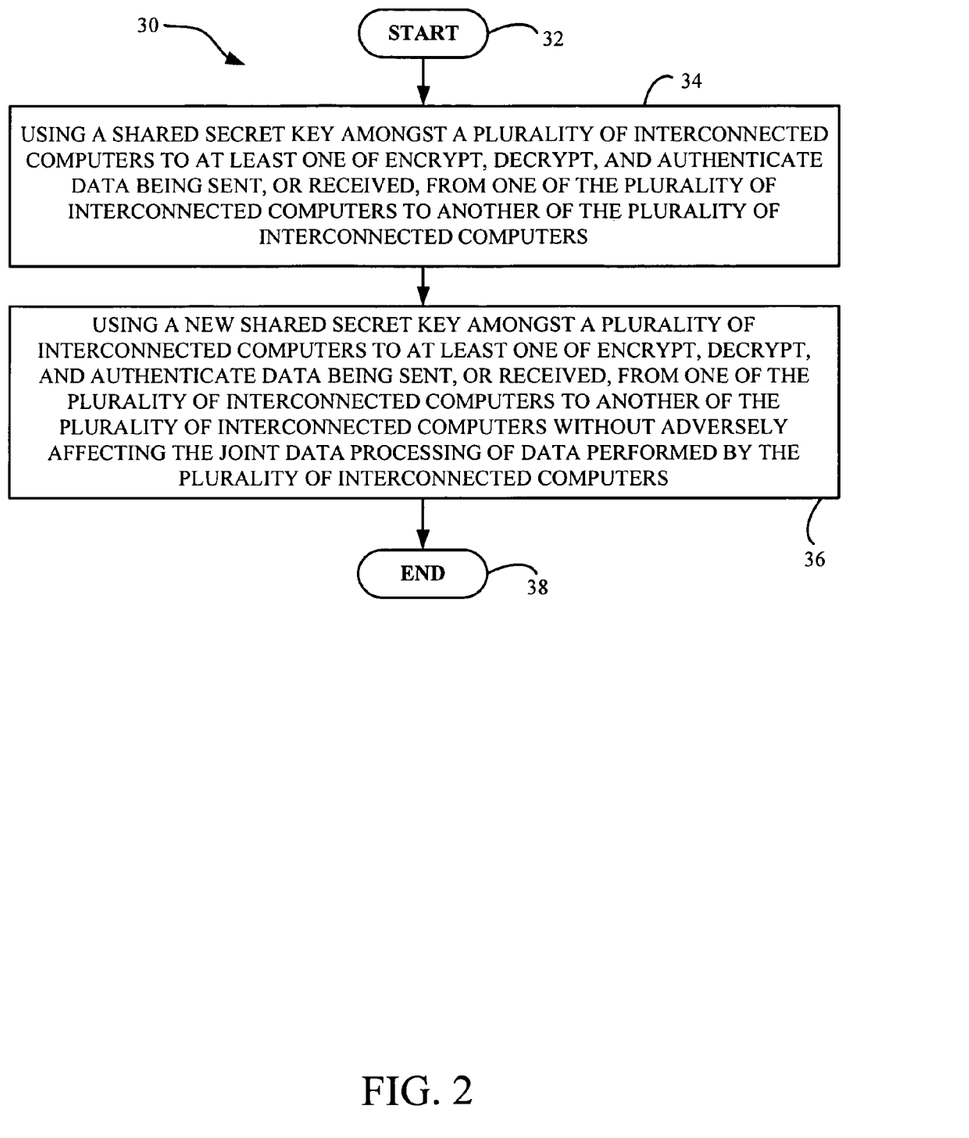
FIG. 2 is a flowchart illustrating method aspects according to the invention.

Another aspect of the invention is a method to improve communication security in cluster machine processing, which is now described with reference to flowchart 30 of FIG. 2. The method begins at Block 32 and may include using a shared secret key amongst a plurality of interconnected computers to at least one of encrypt, decrypt, and authenticate data being sent, or received, from one of the plurality of interconnected computers to another of the plurality of interconnected computers at Block 34.

The method may also include using a new shared secret key by each of the interconnected computers to at least one of encrypt, decrypt, and authenticate data being sent, or received, from one of the interconnected computers to another of the interconnected computers without adversely affecting the joint processing of data performed by the plurality of interconnected computers at Block 36. The method ends at Block 38.

Figure 3:
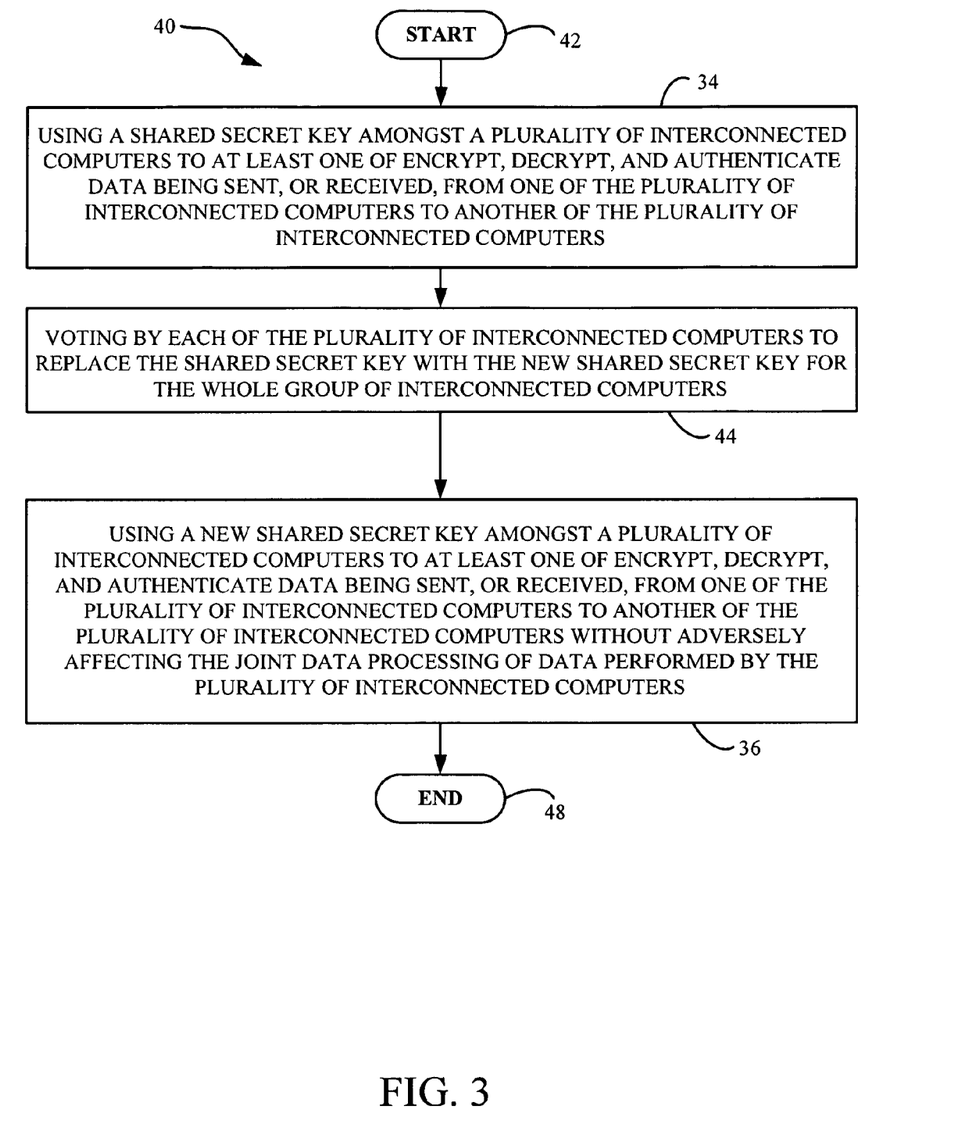
FIG. 3 is a flowchart illustrating method aspects according to the method of FIG. 2.

In another method embodiment, which is now described with reference to flowchart 40 of FIG. 3, the method begins at Block 42. The method may include the steps of FIG. 2 at Blocks 34 and 36. The method may further include voting by each of the interconnected computers to replace the shared secret key with the new shared secret key for the whole group of interconnected computers at Block 44. The method ends at Block 48.

Figure 4:
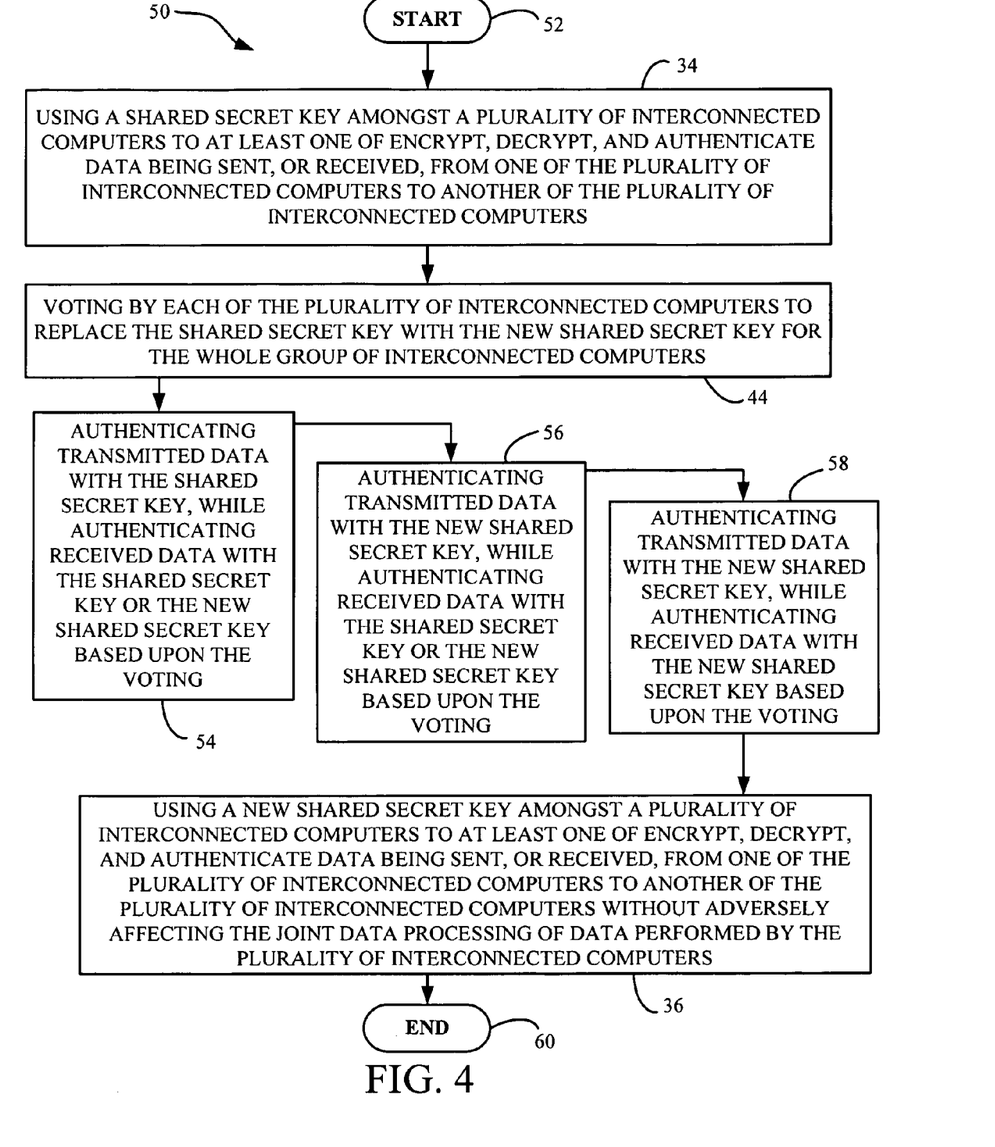
FIG. 4 is a flowchart illustrating method aspects according to the method of FIG. 2.

In another method embodiment, which is now described with reference to flowchart 50 of FIG. 4, the method begins at Block 52. The method may include the steps of FIGS. 2 and 3 at Blocks 34, 36, and 44. The method may also include authenticating transmitted data with the shared secret key, while authenticating received data with the shared secret key or the new shared secret key based upon the voting at Block 54. And/or, the method may further include authenticating transmitted data with the new shared secret key, while authenticating received data with the shared secret key or the new shared secret key based upon the voting at Block 56. And/or, the method may include authenticating transmitted data with the new shared secret key, while authenticating received data with the new shared secret key based upon the voting at Block 58. The method ends at Block 60.

Figure 5:
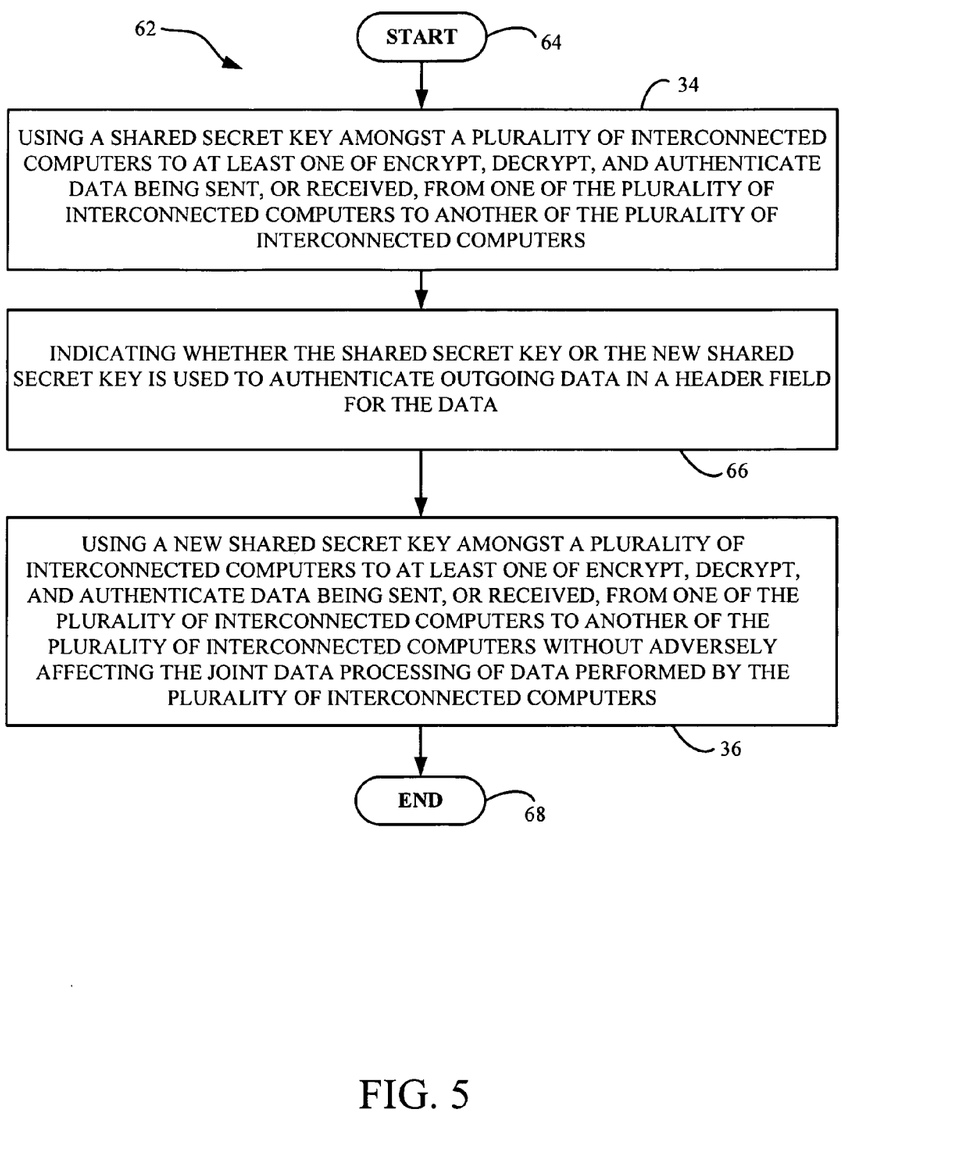
FIG. 5 is a flowchart illustrating method aspects according to the method of FIG. 2.

In another method embodiment, which is now described with reference to flowchart 62 of FIG. 5, the method begins at Block 64. The method may include the steps of FIG. 2 at Blocks 34 and 36. The method may further include indicating whether the shared secret key or the new shared secret key is used to authenticate outgoing data in a header field for the data at Block 66. The method ends at Block 68.

Figure 6:
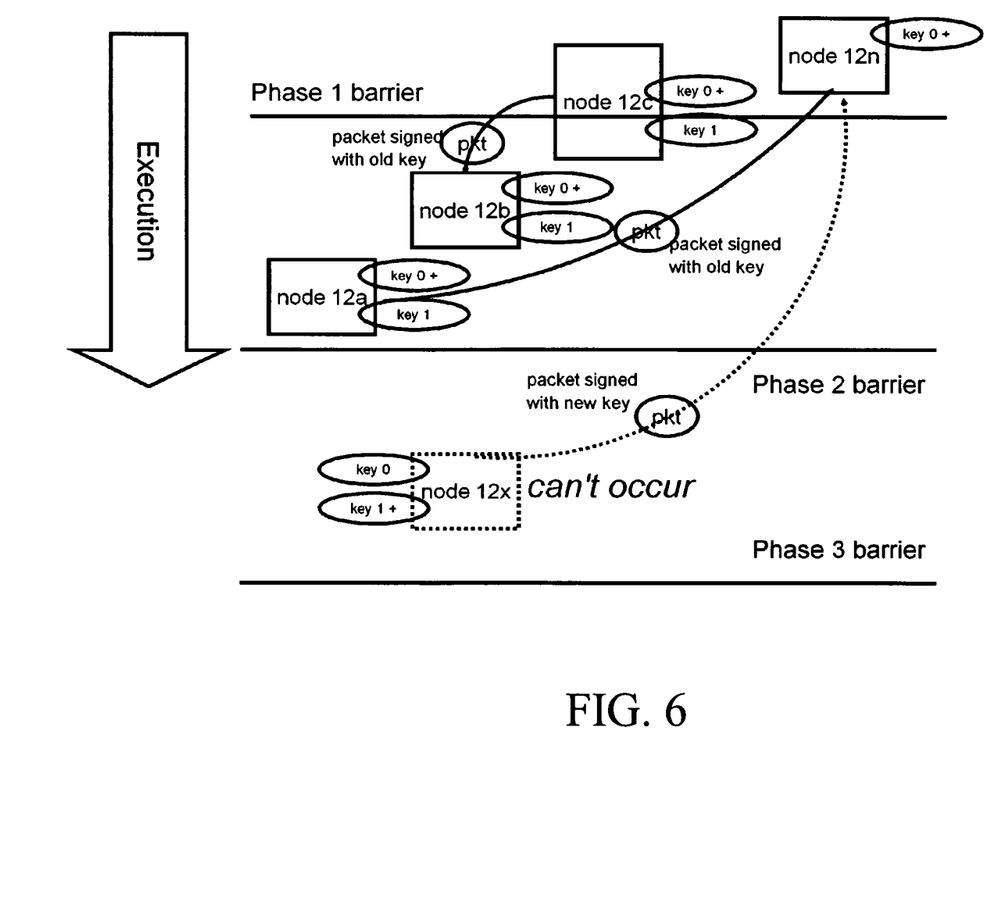
FIG. 6 is a schematic block diagram of a prophetic example system in accordance with the invention of FIG. 1.
Figure 7:
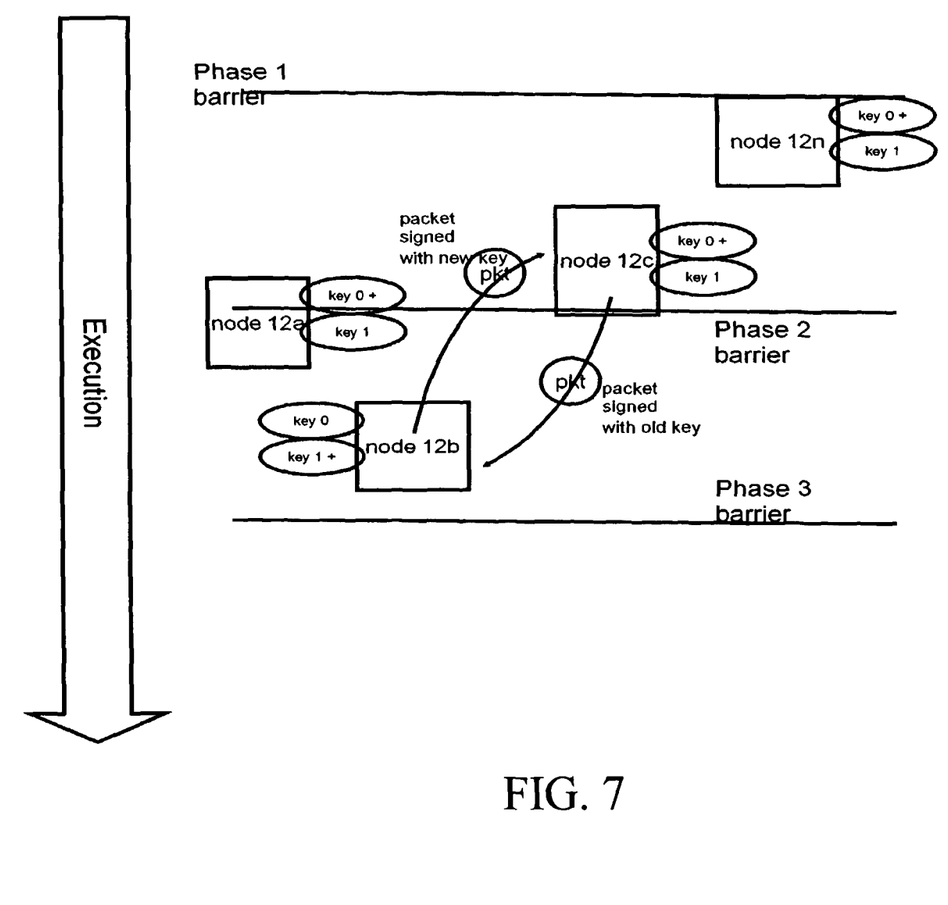
FIG. 7 is a schematic block diagram of a prophetic example system in accordance with the invention of FIG. 1.
Figure 8:
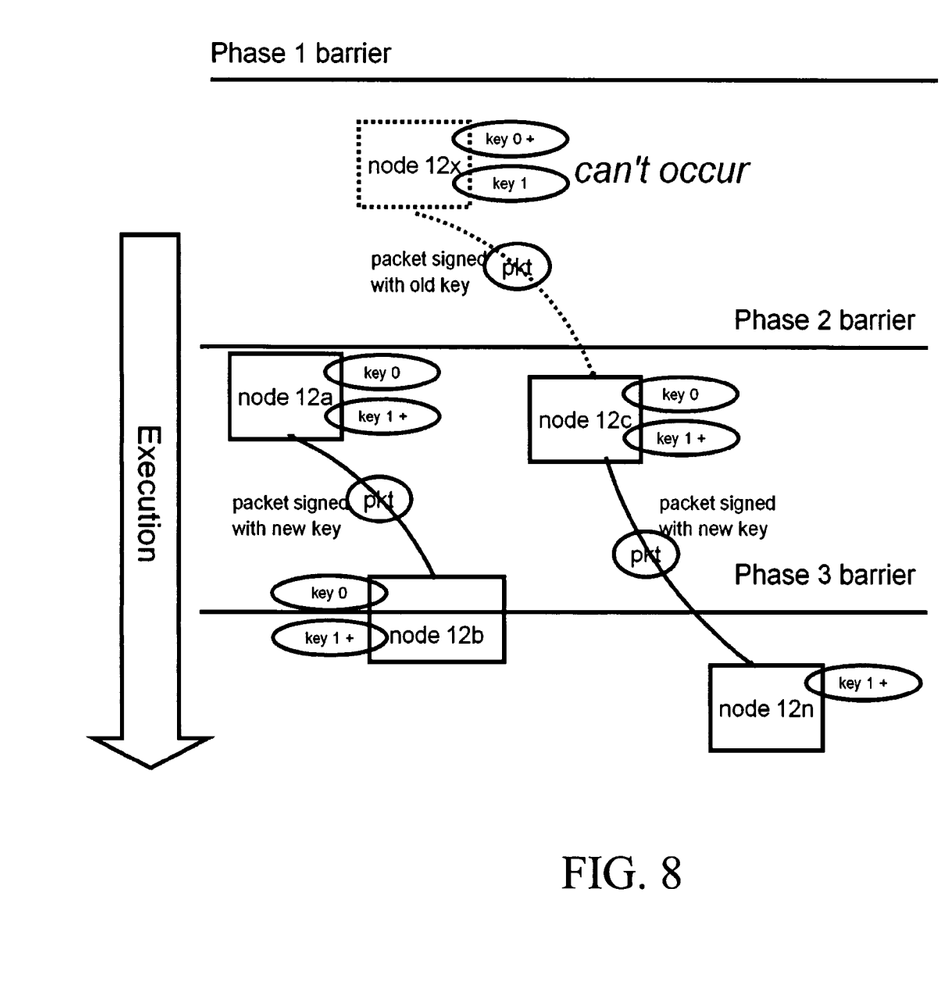
FIG. 8 is a schematic block diagram of a prophetic example system in accordance with the invention of FIG. 1.

A prophetic example of how the system 10 may work is now described with additional reference to FIGS. 6-8. In this embodiment, a distributed cluster of computing nodes 12a-12n is organized into an entity called a peer domain. As the name implies, all nodes 12a-12n in the peer domain can initiate operations which affect the domain. There is a notion of a node 12a-12n being a member of the peer domain, and of a node being online, i.e. active and capable of participating in domain operations.

Nodes 12a-12n may be selected to coordinate operations such as the collective protocols described above, but such roles pass from node to node as needed, and there is no inherent differentiation of the node population into controlling and controlled subsets. The peer domain is maintained by a collection of software components (see implementation details below) with instances executing on each node 12a-12n, which control the peer domain's state by exchanging control messages, e.g. data, between the instances of a particular component across the domain's nodes, and among the instances of the components.

These control messages can be made secure by applying one or more of the above techniques to their contents, and in this way, illegitimate actors can be prevented from acquiring data relevant to the peer domain's state, or affecting it by modifying such data.

Specifically, in distributed clusters of computing nodes 12a-12n it is frequently desirable to run collective communications protocols where all nodes receive the same message, for example containing a command to perform an action, and respond to it in some way, for example, with an indication whether they agree to perform the action.

Such protocols can provide a variety of function in a cluster 12a-12n, for example, to implement a distributed barrier function where all nodes 12a-12n should complete some processing step S[i] before any can proceed to the next step S[i+1], or to gather consensus (agreement from all nodes) that some node may perform some action, for example, that it may stop participating in cluster operations.

These protocols, as any other, are candidates for implementation of message security, both to prevent interference with execution of the protocol e.g. message authentication, and to prevent illegitimate actors from discerning the message content, e.g. message encryption.

In such protocols, some node 12a-12n is usually selected to coordinate execution of the protocol, including transmission of the message to all nodes, gathering and evaluation of responses, detection of failures, or the like. Since the same message is sent to all nodes 12a-12n, it would be inefficient to use public key cryptography to implement message security, since this would require application of the encryption/signature algorithm to the message data using each sender/recipient pair's unique public/private key sets. Instead, it is desirable to use shared secret key 14 mechanisms to implement message security for these protocols since this requires only one pass of the encryption algorithm over the message data, using the shared secret key, before transmission to all nodes. Thus all nodes 12a-12n can invert the encryption using their copy of the shared secret key 14 and derive the original message content from the received encrypted data.

The functionality to implement such collective communication protocols, including the implementation of message security, is frequently packaged into software service layers which expose the functionality to client software entities via some well-known interface. They implement the mechanics of managing the execution of the protocols, and ancillary administrative tasks, such as ensuring that all nodes 12a-12n have an identical copy of the shared secret key 14 currently in use to provide message security, without requiring client involvement in these internal activities. An example of such a service layer is International Business Machine Corporation's ("IBM") Group Services component.

With respect to shared secret key 14 management by such a service layer, this is a complex task from various standpoints. For instance, an initial secret key 14 value which will be shared by all nodes 12a-12n should be generated, usually on some node, and transmitted securely to all nodes. It should be encrypted in some way since otherwise illegitimate actors could acquire it and subsequently compromise message security.

In addition, the shared secret key 14 value may be compromised by various means over time. Thus it is desirable at a regular period, or by explicit user command, to refresh the shared secret key 14 value by replacing the shared secret key currently in use for collective message security across the cluster's nodes 12a-12n with a new shared secret key 16 value and abandon use of the old one.

Assuming that some mechanism exists for placing an initial shared secret key 14 value on all nodes 12a-12n and making it the currently active shared secret key for use in collective message security, refreshing the key presents several difficulties. For example, the new shared secret key 16 value should be encrypted for transmission to all nodes 12a-12n. Additionally, replacing the commonly held shared secret key 14 value with a new one is by nature a consensus operation which should guarantee an orderly and concurrent change from the old key value to the new shared secret key 16 on every node 12a-12n.

Furthermore, collective consensus operations make use of the shared secret key 14 value to authenticate the message traffic implementing them. As result, the consensus operation to distribute and activate a new shared key 16 value will itself need to authenticate its message traffic with some shared secret key 14 value.

Moreover, if distribution of a new shared secret key 16 value and replacement of the old shared secret key 14 value by it is not properly sequenced on all nodes 12a-12n active in the cluster, then the cluster may be sundered into subsets of nodes with different currently active shared key values. These subclusters may be unable to communicate collectively since, because they have different shared key values, they will be unable to authenticate each other's message traffic.

Note that in any set of successive key values {k(0), k(1), ... }, all k(i) are usually assumed to be distinct from each other. With currently common key lengths of even 32 bits and reasonable replacement periods not less than 1 second, this is effectively true.

System 10 may implement shared secret key message security as part of IBM's RSCT cluster technology software layer. There are a number of components of RSCT that may be relevant to provide such.

Phoenix Reliable Messaging ("PRM") may provide a reliable messaging layer including message authentication. PRM may be intended for use by other RSCT components for their internal control message traffic and may not provide interfaces which are available to other IBM products or to third-party software. If a shared secret key 14 value is currently active in the cluster, PRM may use it to sign/verify the header and payload portions of messages it sends and receives on behalf of clients. PRM may not itself manage dissemination and update of the key value.

Group Services ("HAGS") may provide collective communications protocols for consensus via voting, and also a representation of the liveness of nodes 12a-12n active in the cluster. HAGS may use PRM to transmit and receive its internal control message traffic. Thus its message integrity is assured because of PRM's signature/verification of messages it sends.

Topology Services ("HATS") which provides reliable detection of node 12a-12n failures to HAGS. Theoretical results show that a consensus voting and collective communications mechanism like HAGS may not function correctly without being able to rely on an accurate detector of node 12a-12n failures, e.g. one which does not give false negative or positive indications of node liveness. HATS directly uses the currently active shared secret key 14 value to sign the internal control messages its agents on the cluster's nodes 12a-12n send to each other, without making use of PRM.

Resource Monitoring and Control subsystem ("RMC") which provides a generalized representation of cluster resource data which can be instantiated on each node 12a-12n in the cluster. RMC may be a client of HAGS to acquire liveness information for the nodes 12a-12n in the cluster, and may use PRM to transmit and receive its internal control message traffic.

Configuration Resource Manager ("ConfigRM") provides cluster configuration management, including replicated representation of the nodes 12a-12n and communications interfaces comprising the cluster's communications and computational resources. ConfigRM functions as a client of HAGS, making use of it to implement data replication and consensus approval for changes to cluster configuration state. ConfigRM functions as a client of RMC to implement representation of the cluster's configuration data across the cluster's nodes.

Significantly, ConfigRM is the entity which manages the secret key value across the cluster. ConfigRM may be responsible for generating a secret key value, disseminating it across the cluster, and updating it to a new value as needed. ConfigRM may use the collective communications facilities of HAGS to perform the key update operation.

HAGS maintains a notion of some node 12a-12n active in the cluster operating as the "group leader" at any given time. The ConfigRM code running on the node 12a-12n, which is the current HAGS group leader, may control execution of collective communications protocols by using HAGS interfaces to initiate and control consensus communications protocols operating on message data which ConfigRM generates. Once the protocol is initiated, HAGS delivers the message data for the particular collective operation to all nodes 12a-12n, where a processing thread in the ConfigRM agent is activated to respond to the request for the operation.

If the thread successfully performs, or is willing to perform the operation, it does so or prepares to do so, and replies to the HAGS agent on its node 12a-12n with an affirmative vote, indicating that it is willing to allow the protocol to proceed. Conversely, if the ConfigRM agent thread is unwilling to perform the requested operation, it replies to its HAGS agent with a negative vote. The HAGS agents on all nodes 12a-12n forward these local client votes to the HAGS agent on the group leader node, which collates the results and determines whether the protocol can proceed.

Frequently these protocols consist of multiple rounds of activity and voting, which effectively comprise phases of the protocol. In each round, all nodes 12a-12n should respond with an affirmative vote before the group leader can initiate the next round.

If any node 12a-12n fails to vote affirmatively in some round, then the protocol is aborted. If all nodes 12a-12n vote affirmatively in all rounds of the protocol, then the protocol completes successfully, all nodes having performed the requested operations in each round.

The phases are differentiated by the form of the affirmative vote. For instance, the vote for all phases except the last is an indication to continue to the next phase of the protocol, while the vote for the last is an indication that the operation implemented via the protocol is approved and thus complete.

Note that the group leader engages in these voting phases in the same manner as all other active nodes 12a-12n. When the protocol completes, the collective communications subsystem informs the ConfigRM client of HAGS on the group leader node 12a-12n so that it can finalize completion of whatever action required execution of the protocol.

To implement updating of the cluster shared secret key value, the ConfigRM agent on the group leader node 12a-12n will recognize a command to update the cluster shared secret key 14 value. This command can be generated by a software timer, an explicit user command, or the like. On receipt of this command, the group leader will generate a new key value k[n+1] that is to replace the currently active key value k[n].

At this point the group leader formulates and transmits a shared secret key 14 update message to the active nodes 12a-12n in the cluster using the collective communications subsystem. The message will contain the new secret key 16 value and its key version value. The subsystem will encrypt this message for transmission using the shared secret key 14 value currently active on the cluster.

On receipt of this message, each node 12a-12n will extract and decrypt the proposed new secret key 16 value and version from the message and then enter a sequence of consensus voting rounds. In each round, the subset of the two available key values (current and new) that the node's collective communications subsystem uses to encrypt/sign outbound traffic and verify/decrypt received traffic will change to effect an orderly and simultaneous change on all nodes 12a-12n, from exclusive use of the current shared secret key 14 value to exclusive use of the proposed new shared secret key 16 value.

The sequence of these key value subsets at the end of each voting phase is illustrated in FIGS. 6-8. In FIG. 6 transmitted messages will only be authenticated with the current shared secret key 14 value. Received messages can be authenticated with either the current shared secret key 14 or the proposed new shared secret key 16 value.

More particularly with regards to FIG. 6, when phase 1 runs on the nodes 12a-12n, node 12n has not yet executed phase 1 changes and is transmitting and receiving with the old shared secret key 14, e.g. key 0+. In addition, node 12c is currently executing phase 1 changes, has acquired new shared secret key 16, e.g. key 1, but is not using it yet. Node 12b has completed phase 1 changes and is accepting received packets signed with new shared secret key 16, but still using old shared secret key 14 to sign packets it transmits. Node 12a is doing the same; it and node 12b cannot proceed to phase 2 changes until nodes 12c-12n have completed phase 1 changes. In this embodiment, the node 12x scenario cannot occur because some nodes haven't passed phase 1 barrier, so none can pass phase 2 barrier.

In FIG. 7 transmitted messages will only be authenticated with the proposed new shared secret key 16 value. Received messages can be authenticated with either the shared secret key 14 or the proposed new shared secret key 16 value.

With further reference to FIG. 7, when phase 1 is completed on the nodes 12a-12n, node 12n has completed phase 1 changes and is transmitting signed with old shared secret key 14, but accepting packets signed with the new shared secret key 16 value. Node 12c is in the same state. Since nodes 12c-12n have all passed the phase 1 barrier, all nodes 12a-12n are now ready to receive packets signed with the new shared secret key 16.

Thus, node 12b, which has completed phase 2 changes, is accepting received packets signed with shared secret key 14, but is using new shared secret key 16, e.g. key 1+, to sign packets it transmits, and can communicate with nodes 12c-12n. Node 12a is executing the phase 2 changes and can receive packets signed with the new shared secret key 16, but still transmits signed with the old shared secret key 14.

In FIG. 8 transmitted messages will only be authenticated with the proposed new shared secret key 16 value, and received messages can only be authenticated with the proposed new key value. When phase 2 is completed on the nodes 12a-12n, all nodes are now signing transmitted with the new shared secret key 16. Node 12b is executing phase 3 changes, shifting over to only accepting received packets signed with the new shared secret key 16. Node 12n has already completed this step and discarded the old shared secret key 14, but this is okay since all nodes 12a-12n are signing transmitted packets with the new shared secret key 16. In this embodiment, the node 12x scenario cannot occur because of phase barriers—node 12n has passed phase 3, so all nodes 12a-12n should have passed phase 2.

In each phase, each node's 12a-12n ConfigRM agent will inform its collective communications subsystem agents, e.g. in our solution, HAGS, HATS, and PRM, of the appropriate set of key values to use to authenticate message transmission and receipt, and then vote to continue to the next phase in the protocol. Further, if an ordering is induced on the keys when there are two (current and proposed new) present on each node 12a-12n such that the current shared secret key 14 is considered the "first" and the proposed new shared secret key 16 is considered the "second", then which key is used by the sender to authenticate outgoing messages, as well as the count of keys the sender has (1 or 2) is indicated by fields in the message header. Thus the recipient can immediately select the appropriate key to invert the authentication operation.

This mechanism is sufficient to transition all nodes 12a-12n from use of the old shared secret key 14 value, to use of the new shared secret key 16 value and discarding of the old because when the nodes have completed phase 1, they will be authenticating transmitted messages with the current key but accepting received messages authenticated with either the current key or the proposed new key. This allows the nodes 12a-12n to tolerate nodes which have already completed phase 2 and are authenticating their transmitted messages with the proposed new shared secret key 16. Note that if after completing phase 1, nodes 12a-12n started using the new shared secret key 16 to secure transmitted messages, then they would not be able to communicate with nodes which had not yet completed phase 1, since such nodes would not yet have acquired the new key value.

Additionally, when the nodes 12a-12n have completed phase 2, they will be authenticating transmitted messages with the proposed new shared secret key 16, but accepting received messages authenticated with either the current shared secret key 14 or the proposed new key. This allows the nodes 12a-12n to tolerate nodes which have not yet completed phase 2 and are still authenticating their transmitted messages with the current shared secret key 14. Note that if after completing phase 2, the nodes 12a-12n stopped accepting received messages authenticated with the current shared secret key 14, and then they could not communicate with nodes which had not yet completed phase 2, since such nodes would still be securing their transmitted messages with the current key value.

Furthermore, when the collective communications subsystem notifies nodes 12a-12n that they have entered phase 3, all nodes should have completed phase 2, and so no node is signing its transmitted messages with the current shared secret key 14, but rather all nodes are signing their transmitted messages with the proposed new shared secret key 16. Thus it is safe at this point for all nodes 12a-12n to only accept received messages which verify with the proposed new shared secret key 16. The proposed new shared secret key 16 at this point becomes the new currently active shared secret key and the old replaced shared secret key 14 is no longer used and is discarded.

Another aspect of the invention is directed to embodiments that can be embodied in the form of computer-implemented processes and apparatuses for practicing those processes, which is now described with reference to FIG. 9. For example, the system 10 is embodied in computer program code executed by one or more network elements.

Figure 9:
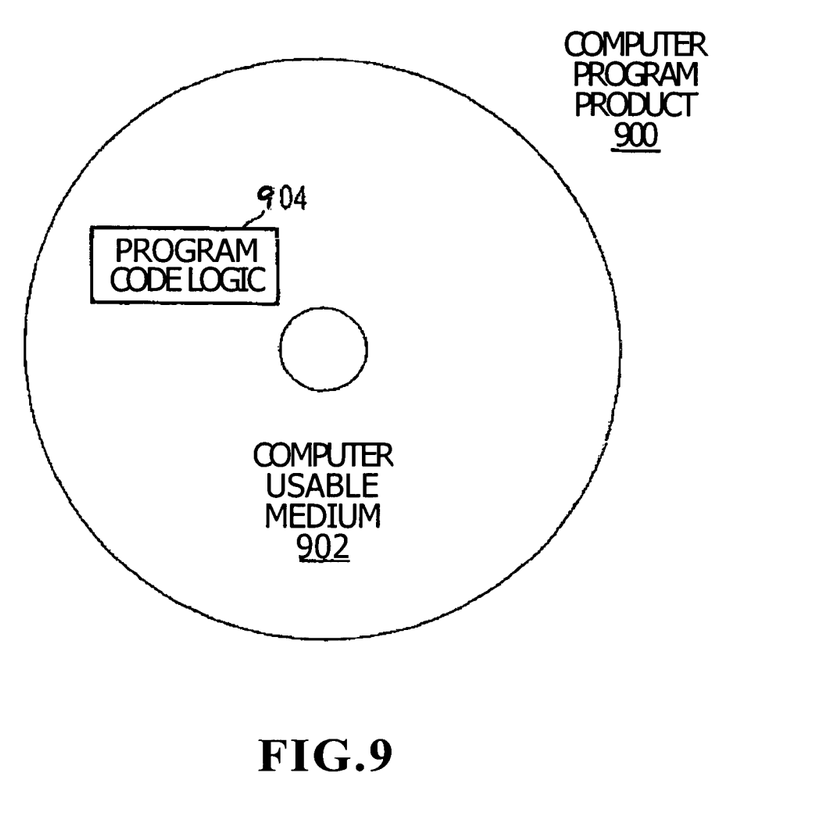
FIG. 9 depicts one embodiment of an article of manufacture incorporating one or more aspects of the invention.

Embodiments include a computer program product 900 as depicted in FIG. 9 on a computer usable medium 902 with computer program code logic 904 containing instructions embodied in tangible media as an article of manufacture. Exemplary articles of manufacture for computer usable medium 902 may include floppy diskettes, CD-ROMs, hard drives, universal serial bus (USB) flash drives, or any other computer-readable storage medium, wherein, when the computer program code logic 904 is loaded into and executed by a computer, the computer becomes an apparatus for practicing the invention.

Embodiments include computer program code logic 904, for example, whether stored in a storage medium, loaded into and/or executed by a computer, wherein, when the computer program code logic 904 is loaded into and executed by a computer, the computer becomes an apparatus for practicing the invention. When implemented on a general-purpose microprocessor, the computer program code logic 704 segments configure the microprocessor to create specific logic circuits.

Additionally, at least one program storage device readable by a machine, tangibly embodying at least one program of instructions executable by the machine to perform the capabilities of the system 10 can be provided. The article of manufacture can be included as a part of a computer system or sold separately.

The capabilities of the system 10 can be implemented in software, firmware, hardware or some combination thereof.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention. Furthermore, the use of the terms a, an, etc. do not denote a limitation of quantity, but rather denote the presence of at least one of the referenced item.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

That which is claimed is:

1. A system to improve communication security for cluster machine processing, the system comprising:
    a plurality of interconnected computers that can jointly process data;
    a current shared secret key used by each of said plurality of interconnected computers to at least one of encrypt, decrypt, and authenticate data being sent or received from one of said plurality of interconnected computers to another of said plurality of interconnected computers;
    a new shared secret key used by each of said plurality of interconnected computers to at least one of encrypt, decrypt, and authenticate data being sent or received from one of said plurality of interconnected computers to another of said plurality of interconnected computers, each of said plurality of interconnected computers configured to vote when to replace said current shared secret key with said new shared secret key for said plurality of interconnected computers;
    a group leader node belonging to the interconnected computers, the group leader node configured to receive a plurality of votes from said plurality of interconnected computers, to collate the votes, and to transmit a message to said plurality of interconnected computers, the message configured to cause said plurality of interconnected computers to change from using the current shared secret key to using the new shared secret key for at least one of encrypt, decrypt, and authenticate data being sent or received from one of said plurality of interconnected computers to another of said plurality of interconnected computers; and
    a secret key transport protocol wherein:
        the group leader node proposes the new shared secret key using the current shared secret key to transmit the new shared secret key;
        until all the interconnected computers indicate receipt of the new shared secret key, the interconnected computers use the current shared secret key to transmit messages to the interconnected computers and accept both the new shared secret key and the current shared secret key in received messages;
        until all the interconnected computers indicate use of the new shared secret key, the interconnected computers use the new shared secret key to transmit messages to the interconnected computers and accept both the new shared secret key and the current shared secret key in received messages; and
        after all the interconnected computers indicate use of the new shared secret key, the plurality of interconnected computers use the new shared secret key to transmit messages and accept only the new shared secret key in received messages; and
        wherein each of said plurality of interconnected computers authenticates transmitted data with said current shared secret key, and authenticates received data with said current shared secret key or said new shared secret key based upon the voting.

2. The system of claim 1 wherein each of said plurality of interconnected computers are connected to each other via at least one of private communication networks and public communication networks.

3. The system of claim 1 wherein each of said plurality of interconnected computers authenticates transmitted data with said new shared secret key, and authenticates received data with said current shared secret key or said new shared secret key based upon the voting.

4. The system of claim 1 wherein each of said plurality of interconnected computers authenticates transmitted data with said new shared secret key, and authenticates received data with said new shared secret key based upon the voting.

5. The system of claim 1 wherein each of said plurality of interconnected computers indicates whether said current shared secret key or said new shared secret key is used to authenticate outgoing data in a header field for the data.

6. The system of claim 1 wherein each of said plurality of interconnected computers indicates a count of said current shared secret key and said new shared secret key it has in a header field for the data.

7. A method to improve communication security for cluster machine processing, the method comprising:
    using a current shared secret key amongst a plurality of interconnected computers to at least one of encrypt, decrypt, and authenticate data being sent, or received, from one of the plurality of interconnected computers to another of the plurality of interconnected computers;
    using a new shared secret key by each of the interconnected computers to at least one of encrypt, decrypt, and authenticate data being sent, or received, from one of the interconnected computers to another of the interconnected computers;

voting by each of said plurality of interconnected computers of when to replace said current shared secret key with said new shared secret key for said plurality of interconnected computers;

using a group leader node belonging to the interconnected computers to receive a plurality of votes from said plurality of interconnected computers, to collate the votes, and to transmit a message to said plurality of interconnected computers, the message configured to cause said plurality of interconnected computers to change from using the current shared secret key to using the new shared secret key for at least one of encrypt, decrypt, and authenticate data being sent or received from one of said plurality of interconnected computers to another of said plurality of interconnected computers; and using a secret key transport protocol wherein:

the group leader node proposes the new shared secret key using the current shared secret key to transmit the new shared secret key;

until all the interconnected computers indicate receipt of the new shared secret key, the interconnected computers use the current shared secret key to transmit messages to the interconnected computers and accept both the new shared secret key and the current shared secret key in received messages;

until all the interconnected computers indicate use of the new shared secret key, the interconnected computers use the new shared secret key to transmit messages to the interconnected computers and accept both the new shared secret key and the current shared secret key in received messages; and after all the interconnected computers indicate use of the new shared secret key, the plurality of interconnected computers use the new shared secret key to transmit messages and accept only the new shared secret key in received messages; and further comprising authenticating transmitted data with the current shared secret key, while authenticating received data with the current shared secret key or the new shared secret key based upon the voting.

8. The method of claim 7 further comprising authenticating transmitted data with the new shared secret key, while authenticating received data with the current shared secret key or the new shared secret key based upon the voting.

9. The method of claim 7 further comprising authenticating transmitted data with the new shared secret key, while authenticating received data with the new shared secret key based upon the voting.

10. The method of claim 7 further comprising indicating whether the current shared secret key or the new shared secret key is used to authenticate outgoing data in a header field for the data.

11. A computer program product embodied in a non-transitory tangible medium comprising:

computer readable program codes coupled to the non-transitory tangible medium to improve communication security for cluster machine processing, the computer readable program codes configured to cause the program to:

use a current shared secret key amongst a plurality of interconnected computers to at least one of encrypt, decrypt, and authenticate data being sent, or received, from one of the plurality of interconnected computers to another of the plurality of interconnected computers;

use a new shared secret key by each of the interconnected computers to at least one of encrypt, decrypt, and authenticate data being sent, or received, from one of the interconnected computers to another of the interconnected computers;

vote by each of said plurality of interconnected computers of when to replace said current shared secret key with said new shared secret key for said plurality of interconnected computers;

use a group leader node belonging to the interconnected computers to receive a plurality of votes from said plurality of interconnected computers, to collate the votes, and to transmit a message to said plurality of interconnected computers, the message configured to cause said plurality of interconnected computers to change from using the current shared secret key to using the new shared secret key for at least one of encrypt, decrypt, and authenticate data being sent or received from one of said plurality of interconnected computers to another of said plurality of interconnected computers; and use a secret key transport protocol wherein:

the group leader node proposes the new shared secret key using the current shared secret key to transmit the new shared secret key;

until all the interconnected computers indicate receipt of the new shared secret key, the interconnected computers use the current shared secret key to transmit messages to the interconnected computers and accept both the new shared secret key and the current shared secret key in received messages;

until all the interconnected computers indicate use of the new shared secret key, the interconnected computers use the new shared secret key to transmit messages to the interconnected computers and accept both the new shared secret key and the current shared secret key in received messages; and after all the interconnected computers indicate use of the new shared secret key, the plurality of interconnected computers use the new shared secret key to transmit messages and accept only the new shared secret key in received messages; and further comprising program code configured to: authenticate transmitted data with the current shared secret key, while authenticating received data with the current shared secret key or the new shared secret key based upon the voting.

12. The computer program product of claim 11 further comprising program code configured to: authenticate transmitted data with the new shared secret key, while authenticating received data with the current shared secret key or the new shared secret key based upon the voting.

13. The computer program product of claim 11 further comprising program code configured to: authenticate transmitted data with the new shared secret key, while authenticating received data with the new shared secret key based upon the voting.

14. The computer program product of claim 11 further comprising program code configured to: indicate whether the current shared secret key or the new shared secret key is used to authenticate outgoing data in a header field for the data.

\* \* \* \* \*